United States Patent [19]

Hane

[11] Patent Number: 4,851,851
[45] Date of Patent: Jul. 25, 1989

[54] METHOD FOR MEASURING THE DISTANCE AND/OR THE RELATIVE VELOCITY BETWEEN TWO OBJECTS

[75] Inventor: Bengt Hane, Solna, Sweden

[73] Assignee: Stiftelsen Institutet for Mikrovagsteknik Vid Tekniska Hogskolan i Stockholm, Stockholm, Sweden

[21] Appl. No.: 88,847

[22] PCT Filed: Dec. 11, 1986

[86] PCT No.: PCT/SE86/00569

§ 371 Date: Jul. 21, 1987

§ 102(e) Date: Jul. 21, 1987

[87] PCT Pub. No.: WO87/03697

PCT Pub. Date: Jun. 18, 1987

[30] Foreign Application Priority Data

Dec. 12, 1985 [SE] Sweden ............... 8505889

[51] Int. Cl.⁴ .................. G01S 13/50; G01S 13/84
[52] U.S. Cl. ..................... 342/112; 342/125; 342/127
[58] Field of Search ............ 342/43, 112, 118, 125, 342/127, 129

[56] References Cited

U.S. PATENT DOCUMENTS

| | | | |
|---|---|---|---|
| 2,907,999 | 10/1959 | Wadley | 343/12 |
| 3,315,257 | 4/1967 | Sauberlich | 342/125 |
| 3,514,777 | 5/1970 | Woerrlein | 342/112 |
| 3,659,293 | 4/1972 | Gupta | 342/112 |
| 3,697,985 | 10/1972 | Faris et al. | 342/112 |
| 3,715,753 | 2/1973 | Applebaum et al. | 342/127 |
| 3,750,172 | 7/1973 | Tresselt | 342/112 |
| 3,766,554 | 10/1973 | Tresselt | 342/112 |
| 3,854,133 | 12/1974 | Cabion | 343/12 R |
| 3,898,655 | 8/1975 | Tresselt | 342/112 |
| 3,913,106 | 10/1975 | Sato | 342/112 |
| 4,101,888 | 7/1978 | Heller et al. | 342/112 |
| 4,307,397 | 12/1981 | Holscher | 342/125 |
| 4,388,622 | 6/1983 | Fletcher, Jr. | 342/112 |
| 4,464,662 | 8/1984 | Tomasi | 342/125 |
| 4,577,150 | 3/1986 | Schreuder | 342/125 |
| 4,646,092 | 2/1987 | Schreuder | 342/125 |

FOREIGN PATENT DOCUMENTS 0096558 12/1988 European Pat. Off. .
0096559 12/1988 European Pat. Off. .

OTHER PUBLICATIONS

The above art, copies attached, were cited in the International Search Report mailed on Feb. 10, 1987.
*NOTE: A U.S. Pat. No. 4,577,150 to Jan Schreuder corresponds to EPA No. 0096558.

Primary Examiner—Thomas H. Tarcza
Assistant Examiner—Mark Hellner
Attorney, Agent, or Firm—Nies, Webner, Kurz & Bergert

[57] ABSTRACT

A method of measuring the distance between two objects and/or the speed of one object in relation to the other, the objects incorporating respectively a transmitter-receiver unit and a transponder or reflector, in which method a phase comparison is made between a signal transmitted by the transmitter-receiver unit and a signal received in the transmitter-receiver unit and transmitted from the transponder or reflector. In accordance with the invention the transmitter-receiver unit is caused to transmit signals of microwave frequency, preferably about 2450 MHz, this transmission comprising the transmission of a first signal having a first frequency, the transmission of at least one second signal having a higher or lower frequency, and the transmission of a third signal having the same frequency as the first mentioned signal, wherewith the phase differences $\phi$ between the transmitted signals are formed, these phase differences corresponding to the distance between the transmitter-receiver unit and the transponder.

7 Claims, 1 Drawing Sheet

U.S. Patent      Jul. 25, 1989      4,851,851
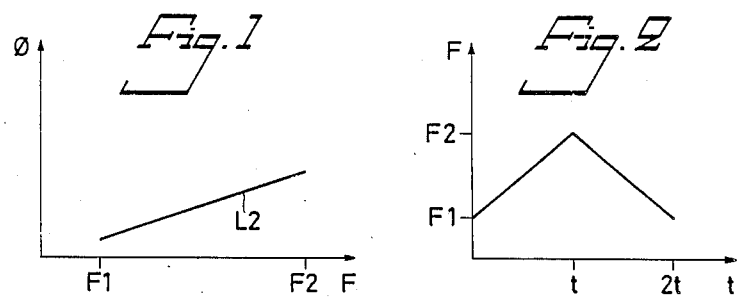
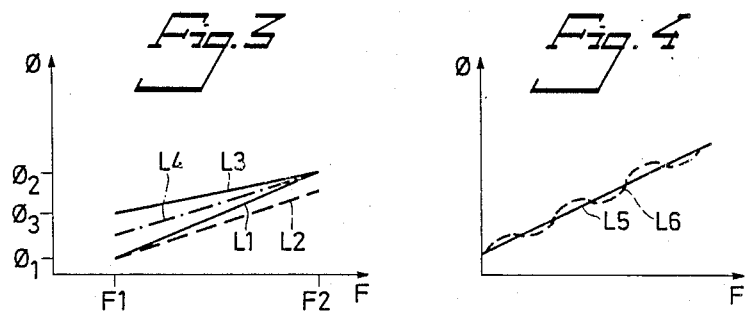
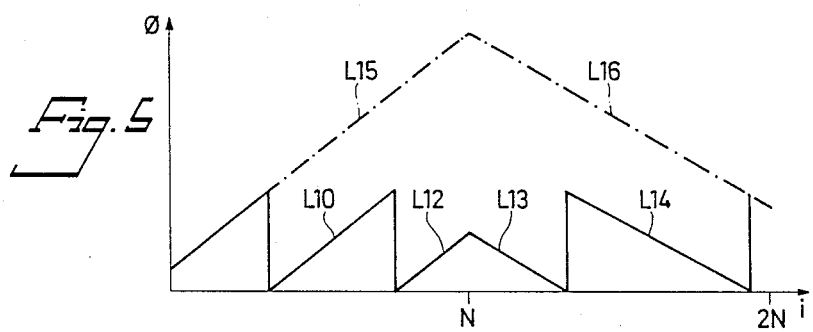
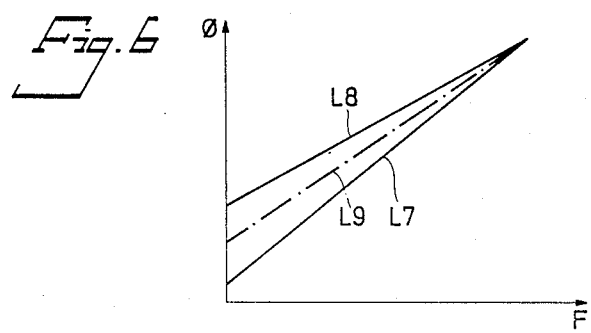

METHOD FOR MEASURING THE DISTANCE AND/OR THE RELATIVE VELOCITY BETWEEN TWO OBJECTS

The present invention relates to a method of measuring the distance and/or the relative velocity between two objects. More specifically, although not exclusively, the invention relates to the measurement of the distance and/or the relative velocity between a first object and a second object, of which the first object incorporates a transmitter-receiver unit and the second object incorporates a transponder. The transmitter-receiver unit is constructed to transmit a signal to the transponder and to receive a signal emanating therefrom.

The invention relates specifically to the measurement of distance and/or velocity by making a phase comparison in the transmitter-receiver unit between the signal transmitted to the transponder and the signal received therefrom.

The concept of the phase difference method in distance measuring processes is well known per se and can be applied with various types of transmitter-receiver apparatus and transponders or reflectors.

When practising the present invention there is preferably used the method and apparatus for creating phase differences described, and illustrated in the Swedish patent specification No. . . . (corresponding to Swedish patent application No. 8505888-1), although it will be understood that the present invention is not at all dependent on the use of this described and illustrated method and apparatus.

Since a phase difference can only be determined within the range $0-2\pi$, the greatest unambiguous distance R for a given transmitted frequency F1 is $$R = c/(2 \cdot F1)$$

where c is the speed of light.

The present invention particularly recommends the use of microwave frequencies. $R_{max}$ is only 6 cms when using the frequency 2500 MHz.

Another problem associated with measuring methods that rely on phase-differences resides in the difficulties which occur when the two objects move in relation to one another, since the phase relationships then change with time.

It is often necessary at times, however, to measure distances under dynamic conditions.

It is also desirable, in many contexts, to be able to determine the location of an object, e.g. a motor vehicle, within a restricted area with a high degree of accuracy, inter alia so as to be able to navigate the vehicle within this area. One common method of determining the position of an object in relation to a reference system is to measure the distance between the object and a number of reference points in the system. The position of the object can be readily calculated from these measured distances, with the aid of trigonometrical functions. The accuracy to which the position of the object is determined is directly proportional to the accuracy to which the distance(s) is (are) measured.

These drawbacks and problems are not found with the method according to the invention, which enables distances to be determined very accurately, even under dynamic conditions, and with which both the distance and the prevailing velocity between the objects can be measured.

Thus, the present invention relates to a method for measuring the distance between two objects and/or the speed at which they move relative to one another, said two objects incorporating respectively a transmitter-receiver unit and a transponder or reflector, in which method a phase comparison is made between a signal transmitted by the transmitter-receiver unit and a signal received thereby from the transponder or reflector, the method being characterized by transmitting from the transmitter-receiver unit signals of microwave frequency, preferably a microwave frequency of about 2450 MHz; transmitting a first signal having a first frequency; transmitting a second signal of higher or lower frequency; transmitting a third signal of the same frequency as the frequency of the first signal; and forming the phase differences $\phi$ between the transmitted signals, these phase differences corresponding to the distance between the transmitter-receiver unit and the transponder.

BRIEF DESCRIPTION OF THE DRAWINGS

The invention will now be described in more detail with reference to various diagrams shown on the accompanying drawings, in which FIGS. 1, 3, 4 and 6 are diagrams in which phase difference is plotted against frequency;

FIG. 2 is a diagram in which frequency is plotted against time; and

FIG. 5 is a diagram in which phase difference is plotted against prevailing frequencies when carrying out a multiple of measuring operations (i).

When measuring distances with the aid of phase-difference measuring techniques, the phase difference between transmitted and received signals is $$\phi = (w_1 \cdot 2R)/c \qquad (1)$$

where $w_1$ is the angular frequency of a signal of frequency F1.

The distance is then $$R = \frac{c \cdot \phi}{2 \cdot w_1} \qquad (2)$$

As beforementioned, the maximum unambiguous distance is $$R_{max} = \frac{c}{2 \cdot F1} \qquad (3)$$

Provided that a second frequency F2 is used in the measuring process, the distance can be calculated from the relationship $$R = \frac{c \cdot (\phi_2 - \phi_1)}{2 \cdot \pi \cdot (F2 - F1)} \qquad (4)$$

The maximum unambiguous distance will then be $$R_{max} = \frac{c}{2 \cdot (F2 - F1)}$$

The process of measuring at two frequencies F1 and F2 is illustrated in FIG. 1, which shows a diagram relating to the phase difference $\phi$ as a function of the frequency F. The inclination of a line extending between the two measuring points thus determines the distance, as seen from the relationship (4).

The aforesaid will only apply, however, when the distance R is constant. Accuracy increases with increasing frequency differences. The unambiguous distance, however, decreases.

If the objects move relative to one another, the error in the measured distance is given by the relationship $$R_{error} = \frac{F2 \cdot v \cdot t}{F2 - F1} \qquad (5)$$

Where v is the relative velocity of the objects and t is the time interval between measurements.

This error is eliminated in accordance with the invention by carrying out a further phase measuring process, in addition to the two phase measuring processes aforementioned, this further phase measurement being made at a lower frequency than the highest frequency F2. It is assumed, by way of example, that the third phase measuring operation is carried out at the frequency F1 and at the time 2t.

Thus, there is transmitted a first signal having the frequency F1, a second signal having the frequency F2, which differs from the frequency F1, and a third signal having the same frequency F1 as the first signal.

Assume that the distance R is changed uniformly with time, in accordance with the expression $$R(t) = R_o + v \cdot t \qquad (6)$$

where $R_o$ is the distance when the time t=0.

Corresponding to expression (1), the phase difference $\phi_2$ deriving from the phase measuring process with frequency F2 carried out at time t can be expressed as $$\phi_2 = \frac{2 \cdot w_2 \cdot R_o}{c} + \frac{2 \cdot w_2 \cdot v \cdot t}{c} \qquad (7)$$

Similar to the expression (7), $\phi_3$ can be expressed as $$\phi_3 = \frac{2 \cdot w_1 \cdot R_o}{c} + \frac{2 w_1 \cdot v \cdot 2 \cdot t}{c} \qquad (8)$$

The above is illustrated in FIG. 2, in which straight lines have been drawn between co-ordinates which constitute the frequency F transmitted at times o, t and 2t.

FIG. 3 illustrates the phase differences $\phi$ which occur, as a function of the transmitted frequency, in which straight lines have been drawn between the measuring points.

The slope of the line L1 in FIG. 3, drawn between the phase differences which occur when measuring with the frequency F1 at time o, and with the frequency F2 at time t, differs from the slope of the broken or discontinuous line L2. The discontinuous line L2 corresponds to the line in FIG. 1. This difference in slope is due to the relative speed of one object to the other. The line L3 connects the phase differences which occur when measuring with the frequency F2 at the time t, and with the frequency F1 at the time 2t.

The distance at time t can be determined from the slope of the broken or discontinuous line L4.

For this reason there is formed a median value of $\phi_1$ and $\phi_3$, referred to as $\phi_4$ $$\phi_4 = \frac{2 w_1 \cdot R_o}{c} + \frac{2 w_1 \cdot v \cdot t}{c} \qquad (9)$$

The distance is calculated from the equation (4), in which $\phi_4$ is inserted instead of $\phi_1$ It will be seen that when formulating $\phi_2 - \phi_4$ in accordance with $$\phi_2 - \phi_4 = \frac{2(w_2 - w_1) \cdot R_o}{c} \quad \frac{2 \cdot (w_2 - w_1) \cdot v \cdot t}{c} \qquad (10)$$

the calculated distance is $$R_{calc} = R_o + v \cdot t,$$

i.e. the real or true distance at time t.

Thus, the distance is calculated with the aid of the expression $$R = \frac{c \cdot (\phi_2 - (\phi_1 + \phi_3)/2)}{2 \cdot \pi \cdot (F2 - F1)} \qquad (11)$$

which corresponds to the slope of the line L4.

This applies provided that the speed is uniform and that measurements are taken at uniform intervals of time.

According to the invention, the speed at any given moment can be determined by forming the difference between $\phi_3$ and $\phi_1'$ $$\phi_3 - \phi_1 = \frac{2 w_1 \cdot v \cdot 2 \cdot t}{c} \qquad (12)$$

$$v = \frac{(\phi_3 - \phi_1) \cdot c}{4 \cdot w_1 \cdot t} \qquad (13)$$

The distance can be readily determined, even when the transmitter-receiver unit and the transponder move relative to one another, by utilizing three phase angles, of which two occur at the same frequency. The first and the third signal conveniently have a frequency of preferably 2450 MHz, and the frequency difference between the frequencies of these signals and the frequency F1 of said second signal is preferably much lower, preferably from 50 kHz to 50 MHz.

According to one preferred embodiment, there are transmitted several series of said first, second, and third signals in successive order, where the frequency differences between the second signal F2 and the remaining two signals F1, F1 increase, which corresponds to a progressively decreasing unambiguous-distance range.

According to another preferred embodiment, at least three series of said first, second, and third signals are transmitted, where the aforesaid frequency differences increase in accordance with a series which is an even multiple of the lowest frequency, preferably the series 50 kHz, 500 kHz and 5 MHz, as exemplified below.

A high degree of accuracy and a long or wide unambiguous range can be had by carrying out a multiple of measurements according to the aforegoing with progressively decreasing distances, i.e. with a progressively increasing difference between the frequencies F2 and F1.

A first series of the first, the second, and the third signal can be used, for example, to determine the distance within a range of 300 meters, when the effective measuring range is 0–300 meters. In this case the frequency difference F2−F1 shall be 50 kHz. The frequency F1 may then be 2450 MHz, for example. A second series of said signals can be used to determine the distance up to a range of 30 meters, in which case the frequency difference F2−F1 shall be 500 kHz. A third series of the signals, with a frequency difference of 5 MHz, can be used to determine the distance to a range of 3 meters, etc. The ultimate degree of accuracy is determined by the level of accuracy within the smallest range, e.g. within the range of 3 meters, corresponding to a frequency difference of 50 MHz. In the measuring operations carried out previous hereto, the only accuracy required is that of determining the correct range.

Instead of first transmitting a frequency F1 followed by a higher frequency F2, which in turn is followed by the first transmitted frequency F1, the second transmitted frequency F2 may be lower than F1.

According to a preferred embodiment of the invention there is utilized a modified form of the aforedescribed method, this modified method being characterized in that the second signal comprises a first series of signals which form a frequency series of progressively rising frequencies, and a second series of signals which form a frequency series of progressively falling frequencies, these series being transmitted in succession.

According to one preferred embodiment the difference between two mutually adjacent frequencies is constant in both frequency series, preferably about 50 kHz.

This embodiment of the invention is described below.

The phase difference $\phi$ between a transmitted and a received signal as a function of the transmitted frequency F can be expressed as $$\phi(F) = \frac{2 \cdot \pi \cdot F \cdot 2 \cdot R}{c} \qquad (14)$$

When derivating $\phi F$ in respect of F, there is obtained $$\frac{d\phi(F)}{dF} = \frac{4 \cdot \pi \cdot R}{c} \qquad (15)$$

Analogous with what was said in the aforegoing with regard to the relationship (4), the distance R can thus be determined from the slope or gradient coefficient of the function $\phi(F)$, namely $$R = k \cdot \frac{c}{4\pi} \qquad (16)$$

The use of solely two points on a curve, as previously described, enables the measuring and calculating process to be effected very quickly.

The use of several points on a curve, however, enables the gradient coefficient k to be determined more accurately, because it is then possible to form a median value.

This results in the suppression of certain types of disturbance, such as disturbances caused by reflexion against an extraneous object in the surroundings, i.e. disturbances of the so-called multiple path type. The gradient coefficient is namely determined chiefly by the distance for the strongest signal, which is normally the direct signal.

Phase contributions from signals additional to the direct signals are added to the direct signals. The remaining signals are manifested as beats in the measured phase function. A phase function is illustrated in FIG. 4 by a continuous line L5. The indirect signals present behave as beats, e.g. as illustrated by the discontinuous line L6.

In addition to the use of a multiplicity of points when determining the phase curve resulting in a reduction in the number of errors caused by beats, it will be understood that the wider the frequency ranges used the greater the extent to which the indirect signals are suppressed.

This embodiment of the method also results in an error in the distance measurement when the objects move relative to one another, if only, for example, one rising series of frequencies is transmitted.

Consequently, the present invention recommends the use of two frequency series, namely one series of rising frequencies and one series of falling frequencies.

For example, the rising frequency series may be $$F(i) = F_o + idF, \text{ where } i = 0, N \qquad (17)$$

and the falling frequency series may be $$F(i) = F_o + N \cdot dF + (N-1)dF, \text{ where } i = N+1, 2N \qquad (18)$$

The total series thus extends from the frequency $F_o$ up to the frequency $F_o = NdF$, and then down to $F_o$, and includes a total of 2N+1 measuring processes.

Assume that the phase measurement is carried out at the time interval $t_1$ and that the distance between the objects is a linear function of the time according to the equation (6).

The phase measured for the frequency series (17) can then be expressed as $$\phi_i(F) = \frac{4\pi}{c} \cdot (F_o + idF)(R_o + i \cdot t_1 \cdot v) \qquad (19)$$

which gives $$\phi_i(F) = \frac{4\pi}{c} \cdot (F_o \cdot R_o + i \cdot dF \cdot R_o + i \cdot F_o \cdot t_1 \cdot v + i \cdot i \cdot dF \cdot t_1 \cdot v) \qquad (20)$$

Correspondingly, the phase measured in respect of the frequency series (18) can be expressed as $$\phi_i(F) = \frac{4\pi}{c} \cdot (F_o \cdot R_o + (2N - i)dF \cdot R_o + i \cdot F_o \cdot t_1 \cdot v + (2N - i) \cdot i \cdot dF \cdot t_1 \cdot v) \qquad (21)$$

The various phases $\phi_i(F)$ according to the expression (20) correspond to the line L15 in FIG. 5, and the various phases $\phi_i(F)$ according to the expression (21) correspond to the line L16 in FIG. 5.

Values which correspond to the chain line L9 can be obtained, by forming a series of median values of the points $\phi_i(F)$ corresponding to the lines L7 and L8.

The series can be written as $$\phi SUM_i = \frac{\phi_i + \phi_{2N-1}}{2} \text{ where } i = 0, N \qquad (22)$$

The relationship expressed in (22) can also be written as $$\phi SUM_i = \frac{4\pi}{c} \cdot (F_o \cdot R_o + idF \cdot R_o + \quad (23)$$

$$N \cdot F_o \cdot t_1 \cdot v + i \cdot N \cdot dF \cdot t_1 \cdot v)$$

where i=0,N

According to the relationship (15) the slope or gradient coefficient k is $$k = \frac{4\pi}{c \cdot dF} \cdot (dF \cdot R_o + N \cdot dF \cdot t_i \cdot v) \quad (24)$$

The calculated distance according to the relationship (16) is $$R_{calc} = \frac{dF \cdot R_o + N \cdot dF \cdot t_1 \cdot v}{dF} = R_o + N \cdot t_1 \cdot v \quad (25)$$

which corresponds to the real or true distance at time $t=N \cdot t_i$. Thus, the distance is not affected by the speed.

The phase differences $\phi(F)$ according to the relationship $\phi SUM$; above (22) can therefore be used to calculate the distance R, via a calculation of the gradient coefficient of a straight line on which the values $\phi SUM_i$ lie.

The median value of the gradient coefficient k is determined by linear regression according to the lowest root-error-square method in a known way, or by some other known method of forming median values.

The gradient coefficient k thus obtained is inserted in the above relationship or equation (26), and the distance calculated therefrom.

A multiplicity of phase differences are obtained, when measuring in accordance with the frequency series (17) and (18). The thus measured phase differences may, for instance, produce phase differences $\phi$ such as those illustrated in FIG. 5, where $\phi$ is shown as a function of i, i.e. the frequency that is transmitted on the i:nth transmission. The reason for the saw-tooth curve is because the phase difference can be at most $2\pi$. Consequently, the phase jump must be straightened with each passage of $2\pi$. This can be effected in accordance with the following algorithm.

When $\phi_{i+1} - \phi_i < \phi_v$, the value $\phi_{i+1}$ shall be substituted for the value $\phi_{i+1} = \phi_{i+1} + 2\pi$, where i=0,N−1.

When $\phi_{i+1} - \phi_i > \phi_v$, the value $\phi_{i+1}$ shall be substituted for the value $\phi_{i+1} = \phi_{i+1} - 2\pi$, where i=N,2N−1.

The angle $\phi_v$ lies within the range $0-2\pi$ and is preferably around zero (0) in the case of static measurements and is selected at higher values with increasing velocities v.

$\phi_v$ is preferably chosen in accordance with the relationship $$\phi_v = \frac{4\pi \cdot F_o \cdot t_1 \cdot v_{max}}{c} \quad (26)$$

Graphically, the aforesaid algorithm corresponds to the continuous curve sections L10—L14 in FIG. 5 straightened to form the chain-line curve L15,L16.

As will be evident from above, FIG. 6 corresponds in principle to FIG. 3. The gradient coefficient of the chain line 29 corresponds to the distance, as beforementioned.

As mentioned above with reference to the relationship or equation (13), the momentary velocity can also be calculated as $$v = \frac{(\phi_{i=2N} - \phi_{i=0}) \cdot c}{2N \cdot t_1 \cdot 2\pi \cdot F_o} \quad (27)$$

It will therefore be obvious that the second embodiment of the present invention affords an extremely accurate result.

However, it is preferred in accordance with a third embodiment of the invention to apply a combination of measuring operations, in which a measuring operation according to the first mentioned embodiment is effected in order to determine the distance range within which the transponder is located in relation to the transmitter-receiver unit, and in which the last mentioned embodiment is used to determine, with extreme accuracy, the location of the transponder within the range established. In this way, only a few frequencies need be transmitted in order to determine, e.g., a range of 3 meters, whereafter a rising or falling frequency series comprising a smaller number of frequencies is transmitted.

Thus, this combination embodiment enables a lower number of frequencies to be transmitted while achieving a high degree of accuracy. The total time taken to carry out a measurement is also reduced, which is a great advantage when the velocity v in the system is high.

Instead of transmitting a first frequency series with rising frequencies, followed by a second frequency series with falling frequencies, there can be transmitted a first frequency series of falling frequencies followed by a second frequency series of rising frequencies.

It will be evident from the aforegoing that the present invention overcomes all of the problems mentioned in the introduction and constitutes an important step forward in the art.

The invention is not restricted to the described and illustrated embodiments, but can be modified within the scope of the following claims.

I claim:

1. A method of measuring the distance between, and/or the mutual relative speed, of two objects which respectively include a transmitter-receiver unit and a transponder, and in which method a phase comparison is made between a signal transmitted from the transmitter-receiver unit and a signal received in said unit from the transponder, wherein the transmitter-receiver unit is caused to transmit plural signals of microwave frequency, approximately about 2450 MHz; said transmission of plural signals comprising transmitting a first signal having a first frequency; transmitting at least one second signal having a higher or a lower frequency than said first signal; transmitting a third signal having the same frequency as said first mentioned signal; said first, second and third signals being transmitted in succession, all of said first, second and third signals being of microwave frequency as herein set forth, and all of said first, second and third signals, while transmitted, being continuous wave signals whereby, for each said transmitted signal a phase difference $\phi$ between the transmitted and received signal is formed, which phase differences correspond to the distance between the transmitter receiver unit and the transponder, characterized in that said second signal includes a first series of signals that form a frequency series of successively rising frequencies and a second series of signals that form a frequency series of successively falling frequencies, said first series, and said second series, being transmitted in succession, whereby a median value (slope L9) is formed of the respective change of the phase difference with the frequency (slope L8;L9) that occurs during the series of rising frequencies and falling frequencies respectively, which median value (slope L9) corresponds to said distance.

2. A method according to claim 1, characterized in that the first and the third said transmitted signals, both have a frequency of 2450 MHz; and in that the frequency differential between the frequency of said first and third transmitted signals and the frequency of the said second transmitted signal is substantially lower, and within the range from 50 kHz to 50 MHz.

3. A method according to claim 1, characterized in that the difference between two mutually adjacent frequencies in each said series of frequencies is constant, about 50 kHz.

4. A method according to claim 1, characterized by transmitting in succession a plurality of series of said first, second, and third signals, in which the frequency difference between the said second signal and the two remaining signals rises, which corresponds to a successive decrease in the unambiguous distance range between the objects.

5. A method according to claim 1, characterized by transmitting in a first stage and in succession a plurality of series of said first, second, and third signals, in which the frequency difference between the second signal and the two remaining signals rises, which corresponds to a successive decrease in the unambiguous distance range between the objects; and by transmitting in a second stage said two frequency series of successively rising and successively falling frequencies respectively, and determining the distance between the unambiguous distance range.

6. A method according to claim 4, characterized in that said series of said first, second, and third signals are at least three in number; and in that said frequency differences rise in accordance with a series which is an even multiple of the lowest frequency difference, for example the series 50 kHz, 500 kHz and 50 MHz.

7. A method according to claim 1, characterized by forming the differential between the phase difference that occurs when transmitting the first transmitted frequency and the phase difference that occurs when transmitting the last transmitted frequency, which last transmitted frequency is equal to the first transmitted frequency, said differential corresponding to the momentary velocity of one object in relation to the other.

* * * * *